United States Patent [19]

Fujita et al.

[11] 4,164,529

[45] Aug. 14, 1979

[54] PROCESS FOR PREPARING TUBULAR FILM OF HYDROLYZED ETHYLENE-VINYL ACETATE COPOLYMER

[75] Inventors: Yukio Fujita, Otsu; Teruo Iwanami, Takatsuki; Yoshimi Akamatsu, Amagasaki, all of Japan

[73] Assignee: Nippon Gohsei Kagaku Kogyo Kabushiki Kaisha, Osaka, Japan

[21] Appl. No.: 839,260

[22] Filed: Oct. 4, 1977

[51] Int. Cl.$^2$ ............................................. B29D 23/04
[52] U.S. Cl. .................................. 264/565; 264/173; 264/185; 264/237; 264/290.2
[58] Field of Search ............... 264/95, 209, 173, 40.1, 264/185, 210 R, 237, 348, 290 R; 425/326.1

[56] References Cited

U.S. PATENT DOCUMENTS

| | | | |
|---|---|---|---|
| 3,061,884 | 11/1962 | Hirano et al. | 264/185 |
| 3,425,979 | 2/1969 | Monaghan et al. | 264/95 |
| 3,595,735 | 7/1971 | Tyrrell | 264/95 |
| 3,957,941 | 5/1976 | Kawaguchi | 264/185 |

FOREIGN PATENT DOCUMENTS 51-28160  9/1976  Japan ......................................... 264/95

*Primary Examiner*—Jeffery R. Thurlow
*Attorney, Agent, or Firm*—Armstrong, Nikaido, Marmelstein & Kubovcik

[57] ABSTRACT

In a typical tubular extrusion of hydrolyzed ethylene-vinyl acetate copolymer having an ethylene content of 15 to 50% by mole and a degree of hydrolysis in the vinyl acetate units of not less than 90% by mole, an improved process for preparing the tubular film without wrinkle by controlling the surface temperature of the tubular film at the nip rolls within the range of 50° to 100° C.

4 Claims, No Drawings

PROCESS FOR PREPARING TUBULAR FILM OF HYDROLYZED ETHYLENE-VINYL ACETATE COPOLYMER

BACKGROUND OF THE INVENTION

The present invention relates to an improved process for preparing a tubular film of hydrolyzed ethylene-vinyl acetate copolymer.

The hydrolyzed ethylene-vinyl acetate copolymer has a higher impermeability for oxygen than other thermoplastic resins and also has the excellent antistatic property and oil resistance. Therefore, the film of said copolymer has been expected as wrapping or packaging materials for foods and drugs.

In molding the film of the hydrolyzed ethylene-vinyl acetate copolymer being a kind of thermoplastic resin, both of tubular extrusion and flat film extrusion have been proposed like other known thermoplastic resins, but the tubular extrusion has not commercially employed yet.

The present invention relates to a tubular extrusion.

The term "tubular extrusion" as used herein means a typical process which comprises extruding the copolymer through a circular die, followed by expansion by the pressure of internal air admitted through the center of a mandrel, collapsing of the bubble and winding up through the nip rolls, and is called "blow-extrusion process" or "inflation process", too.

This process has been commercially employed for polyethylene, polypropylene, and so on.

Many attempts have been made by the present inventors to prepare a tubular film of the hydrolyzed ethylene-vinyl acetate copolymer on the basis of known tubular extrusion for polyethylene, but optimum conditions for the resin are not suitable for the copolymer. For instance, when the tubular film is extruded at the same condition to polyethylene, a large number of wrinkles occurs on passing the nip rolls. Also when the tubular film is drawn by nip rolls after biaxially stretching it, the film is often teared off. Such troubles upon passing through nip rolls are not seen in the preparation of a tubular film of other thermoplastic resins such as polyethylene and polypropylene. Continual attempts have therefore been made to eliminate such troubles under the notion that they are caused by the physical properties peculiar to the hydrolyzed ethylene-vinyl acetate copolymer.

OBJECTS OF THE INVENTION

It is an object of the present invention to provide a process for preparing a film from hydrolyzed ethylene-vinyl acetate copolymers by tubular extrusion.

A further object of the invention is to provide a process for preparing a tubular film of hydrolyzed ethylene-vinyl acetate copolymer without any troubles such as occurrence of wrinkle and tear of the film.

These and other objects of the invention will become apparent from the description hereinafter.

SUMMARY OF THE INVENTION

The present invention provides a process for preparing a tubular film of hydrolyzed ethylene-vinyl acetate copolymer which comprises melting the hydrolyzed ethylene-vinyl acetate copolymer in an extruder, extruding the melted copolymer through a circular die in tubular form, expanding the tube to a bubble by the pressure of internal air admitted through a mandrel, collapsing the bubble and winding up through nip rolls where the surface temperature of the film is maintained at 50° to 100° C.

DETAILED DESCRIPTION

It has now been found that the before-mentioned troubles can be eliminated by maintaining the surface temperature of the tubular film passing through nip rolls at 50° to 100° C.

In tubular extrusion for polyethylene and polypropylene, the surface temperature of the film passing through nip rolls is generally cooled to a room temperature by blowing air or water. When the temperature is over 50° C., the film causes blocking on passing through nip rolls and the flattened tube cannot be restored to tubular form.

In contrast to polyethylene and polypropylene, the tubular film of the hydrolyzed ethylene-vinyl acetate copolymer free from wrinkle and tearing off can be prepared by maintaining the surface temperature of the film passing through the nip rolls at 50° to 100° C. When the temperature of the film is below 50° C., a large number of wrinkles occurs. Also when the temperature is over 100° C., no wrinkle occurs, but the film causes blocking. The film upon passing through nip rolls is preferably maintained at a temperature of 55° to 90° C.

The hydrolyzed ethylene-vinyl acetate copolymer having an ethylene content of 15 to 50% by mole and a degree of hydrolysis in the vinyl acetate units of not less than 90% by mole is employed in the present invention. The hydrolyzed copolymer having a composition outside the above range is not applicable to the process of the present invention, since physical properties of the film are inferior. There may also be employed in the present invention the hydrolyzed copolymer containing a small amount of further units of a monomer copolymerizable with ethylene and vinyl acetate, for instance, olefins such as propylene and isobutylene, unsaturated acids such as acrylic acid, methacrylic acid, crotonic acid and maleic acid and esters thereof.

The hydrolyzed ethylene-vinyl acetate copolymer is supplied in a form of powders or pellets to an extruder equipped with a circular die and is heated to about 170° to about 260° C. to melt. The melted material is extruded through a slit of the circular die in tubular form. The tube is expanded to the desired diameter by the pressure of internal air admitted through the mandrel, and the bubble is cooled, collapsed and drawn by nip rolls at a constant rate. When the temperature of the film drops below 50° C. before the tubular film reaches nip rolls, the tubular film is heated by means of a hot air, infrared heater or electric heater so as to maintain the temperature of the tubular film passing through nip rolls at 50° to 100° C. Also when the temperature is over 100° C., the tubular film is cooled, for instance, by blowing a cool air before it reaches nip rolls.

The process of the present invention is applicable not only to the preparation of a single layer film of the hydrolyzed ethylene-vinyl acetate copolymer alone, but also to the preparation of a laminated film thereof with other thermoplastic resins by tubular extrusion. It is one of the significant features of the present invention that laminated films of the hydrolyzed copolymer and other thermoplastic resins can be formed by tubular extrusion under the condition as defined before without any troubles. Examples of the other thermoplastic resins adoptable to the lamination with the hydrolyzed copolymer are polyethylene, polypropylene, ethylene-propylene copolymer, ionomer, ethylene-vinyl acetate copolymer, polybutene, polypentene, polyvinyl chloride, polyamide, polyester and polyurethane. The laminated films are prepared according to known processes. The hydrolyzed ethylene-vinyl acetate copolymer and other thermoplastic resins are supplied to a coextrusion apparatus equipped with multiple extruders and melted respectively. The melted resins are extruded in tubular form so that the melted layers contact with each other before or just behind a die slit. The tube is expanded to the desired diameter by the pressure of internal air addmitted through the mandrel and then drawn by nip rolls at a constant rate.

The present invention is also applicable to the preparation of the biaxially oriented film by a known technique. For instance, the tubular orientation is carried out as follows: The tubular film is first cooled, and is collapsed by nip rolls. Then, the film is gradually reheated to an orienting temperature and is expanded by an internal air pressure and is drawn by nip rolls rotating at a higher speed than that of the above-mentioned nip rolls. Thus, the biaxially oriented film is prepared.

The present invention is more specifically described and explained by means of the following Examples.

EXAMPLE 1

Employing pellets of hydrolyzed ethylene-vinyl acetate copolymer having an ethylene content of 28% by mole and a degree of hydrolysis in the vinyl acetate units of 99.3% by mole, a film was formed by tubular extrusion under the following conditions.

Forming Conditions

Extruder—Extruder having a diameter of 55 mm.
Screw—Rapid compression type screw of L/D=26 and compression ratio=2.8
Die—Center feed spiral die of lip diameter=200 mm. and lip width=0.8 mm.
Extrusion temp—220° C. at the front of the cylinder and 190° C. at die
Screw speed—100 r.p.m.
Extrusion amount—32 kg./hour
Temp. of air blown—Room temperature
Blow-up ratio—2.2
Wind-up speed—17 m./minute
Film temp—80° C. (just before passing through nip rolls)

There was thus produced a film having a width of 690 mm. in flattened state and an average thickness of 20μ which was free from wrinkles and was satisfactorily wound up on a reel.

The surface temperature of the film was measured by an infrared thermometer commercially available under the tradename of Temp Tron Thermometer Model IT—7 made by Barnes Engineering Inc.

COMPARATIVE EXAMPLES 1 AND 2

The procedure of Example 1 was repeated except that the temperature of the film passing through nip rolls was maintained at 40° C. (Comparative Example 1). The thus produced film showed a large number of wrinkles and also the state of the film wound up was not in good order.

The procedure of Example 1 was also repeated except that the film temperature was maintained at 110° C. (Comparative Example 2). There was no occurrence of wrinkle, but the film blocked and the flattened tubular film could not be restored to tubular form.

COMPARATIVE EXAMPLE 3

A film was formed from high density polyethylene having melt index of 0.7 and density of 0.955 by tubular extrusion using the apparatus of Example 1. When the temperature of the film was maintained at below 40° C. upon passing through nip rolls, the film was stably formed. But at a higher temperature than 40° C., the tubular film sagged due to insufficient cooling. Further, at a temperature of over 80° C., the tubular film flattened by nip rolls could not partially be restored to tubular form due to blocking.

EXAMPLES 2 TO 5 AND COMPARATIVE EXAMPLES 4 TO 7

Films were prepared according to Example 1 by varying the composition of the hydrolyzed ethylene-vinyl acetate copolymer and the forming conditions as shown in the following Table.

The results are shown in the Table.

| | | Forming Conditions | | | | | width of film flattened mm. | Thickness of film μ | wrinkle | Blocking | State of film wound up |
|---|---|---|---|---|---|---|---|---|---|---|---|
| | Hydrolyzed copolymer | Die — | Extrusion amount kg./hr. | Blow-up ratio — | Wind-up speed m./min. | Film temp. at nip rolls °C. | | | — | — | — |
| Ex. 2 | A | I | 42 | 2.0 | 20 | 90 | 310 | 47 | not present | no occurrence | good |
| Ex. 3 | A | I | 42 | 3.0 | 20 | 60 | 470 | 30 | not present | no occurrence | good |
| Ex. 4 | B | II | 32 | 3.0 | 20 | 55 | 470 | 24 | not present | no occurrence | good |
| Ex. 5 | B | II | 32 | 2.5 | 10 | 70 | 395 | 55 | not present | no occurrence | good |
| Com. Ex. 4 | A | I | 42 | 2.0 | 20 | 43 | 310 | 47 | present | no occurrence | bad |
| Com. Ex. 5 | A | I | 42 | 2.0 | 37 | 115 | 310 | 25 | not present | occurrence | bad |
| Com. Ex. 6 | B | II | 32 | 3.0 | 20 | 40 | 470 | 24 | present | no occurrence | bad |
| Com. Ex. 7 | B | II | 32 | 2.0 | 42 | 108 | 310 | 17 | not | | |

| | Forming Conditions | | | | | | | | | |
|---|---|---|---|---|---|---|---|---|---|---|
| Hydrolyzed copolymer | Die | Extrusion amount kg./hr. | Blow-up ratio | Wind-up speed m./min. | Film temp. at nip rolls °C. | width of film flattened mm. | Thickness of film μ | wrinkle | Blocking | State of film wound up |
| | | | | | | | | present | occurrence | bad |

(Note)
"A" is hydrolyzed ethylene-vinyl acetate copolymer having ethylene content of 20% by mole and degree of hydrolysis in vinyl acetate units of 99.6% by mole.
"B" is hydrolyzed ethylene-vinyl acetate copolymer having ethylene content of 38% by mole and degree of hydrolysis in vinyl acetate units of 98.5% by mole.
"I" is a center feed spider die having lip diameter of 100 mm. and lip width of 0.6 mm.
"II" is a center feed spiral die having lip diameter of 100 mm. and lip width of 0.6 mm.

EXAMPLE 6

Coextrusion was carried out under the following conditions.

Feed Resins

A: Low density polyethylene having melt index of 2.0 and density of 0.922
B: Hydrolyzed ethylene-vinyl acetate copolymer having ethylene content of 36% by mole and degree of hydrolysis in vinyl acetate units of 98.9% by mole

Forming Conditions

Extruder
    A: Extruder having a diameter of 55 mm.
    B: Extruder having a diameter of 30 mm.
Screw—A and B: Screw of L/D=26 and compression ratio=2.8
Die—A and B: Spiral die of lip diameter=200 mm. and lip width=0.8 mm.
Extrusion temp
    A: 210° C. at the front of cylinder and 210° C. at die
    B: 230° C. at the front of cylinder and 210° C. at die
Screw speed
    A: 40 r.p.m.
    B: 50 r.p.m.
Extrusion amount
    Total 37.7 kg./hour
    (A: 28.2 kg./hour, B: 9.5 kg./hour)
Temp. of air blown—Room temperature
Blow-up ratio—1.5
Wind-up speed—15 m./minute
Film thickness after winding up—45μ (Outer layer A: 30μ, Inner layer B: 15μ)
Film temp—80° C. (just before passing through nip rolls)

There was thus produced a laminated film of two layers having a width of 470 mm. in flattened state which was free from wrinkle and was satisfactorily wound up.

What we claim is:

1. In a process for preparing a continuous tubular film of hydrolyzed ethylene-vinyl acetate copolymers by melt-extruding the hydrolyzed copolymer through a circular die in the form of tube, expanding the tube to a bubble by the pressure of internal air admitted through a mandrel, collapsing the bubble and winding up the film through nip rolls, the improvement which comprises employing hydrolyzed ethylene-vinyl acetate copolymers having an ethylene content of 15 to 50% by mole and a degree of hydrolysis in the vinyl acetate units of not less than 90% by mole and maintaining the surface temperature of the film at the nip rolls within the range of 50° to 100° C.

2. The process of claim 1, wherein a polyolefin is melted in an extruder and is extruded together with the melted hydrolyzed ethylene-vinyl acetate copolymer to give a laminated film consisting of an outer layer of the polyolefin and an inner layer of the hydrolyzed copolymer.

3. The process of claim 1, wherein the temperature of the film passing through nip rolls is from 55° to 90° C.

4. The process of claim 1, wherein the tubular film is subjected to biaxial orientation before reaching nip rolls.

* * * * *